United States Patent [19]
McCoy

[11] Patent Number: 4,744,430
[45] Date of Patent: May 17, 1988

[54] SOLAR POWERED GOLF CART

[76] Inventor: Thomas R. McCoy, 4313 Timor Pl., Sarasota, Fla. 34241

[21] Appl. No.: 85,156

[22] Filed: Aug. 14, 1987

[51] Int. Cl.$^4$ .................. B60L 9/00; B60L 11/00; H01M 10/44
[52] U.S. Cl. .................. 180/2.2; 180/65.3; 136/291; 136/293; 224/274; 280/DIG. 5; 320/2; 320/20; 320/61; 323/906
[58] Field of Search .............. 136/291, 293; 224/274; 280/DIG. 5; 320/2, 20, 61; 180/2.2, 65.3; 323/906

[56] References Cited

U.S. PATENT DOCUMENTS 4,422,031 12/1983 Vigerstøl .......................... 320/2
4,602,694 7/1986 Weldin ........................... 180/2.2
4,651,080 3/1987 Wallace ........................... 320/2

FOREIGN PATENT DOCUMENTS 2484356 12/1981 France .......................... 136/291
57-70748 5/1982 Japan ........................... 136/291

Primary Examiner—Aaron Weisstuch
Attorney, Agent, or Firm—Charles J. Prescott; Raymond H. Quist

[57] ABSTRACT

A solar cell array is disclosed having a support structure, cover, and mechanically joined solar cell panels. Each panel, or group of panels, is electrically connected across a separate battery and a diode is provided to provide separate charging of each battery and to prevent flow of current to the solar cells from the batteries.

14 Claims, 1 Drawing Sheet

SOLAR POWERED GOLF CART

BACKGROUND OF THE INVENTION

1. Field of the Invention

This invention relates generally to vehicles having electric propulsion motors such as golf carts, and more particularly to a battery and solar cell assembly for providing the electric energy.

2. Description of Related Art

Electrically propelled vehicles have been in use since early in this century and have ranged in size from miniature electric trains to large diesel electric locomotives. A substantial number of such vehicles, such as golf carts, have relied on storage batteries as the source of the electrical energy. The golf carts are typically used for eighteen holes of golf and the batteries are then recharged before the cart is used again. It is detrimental to permit the storage batteries to become fully discharged. It is also detrimental to overcharge a storage battery. The battery chargers used for golf carts or the like, which use power supplied by a utility, are typically designed to charge at a relatively high rate when they are first connected, whether or not the batteries to be charged require such a high rate of charge. Such a high rate of charge consequently may be damaging to the batteries, but even if not damaging is expensive in terms of cost of power.

It would consequently be desirable to avoid or minimize the need to use a utility powered battery charger to recharge the vehicle batteries.

The use of solar energy as a source of motive power would be a desirable solution; however, the supply of solar energy does not always match the demand. The use of batteries which are recharged by solar cells and which supplement the energy provided by solar cells when necessary, has been successful for some purposes. A successful arrangement of this type for providing motive power for a vehicle is not known, however.

It is therefore an object of this invention to provide a battery and solar cell assembly for providing the needed electrical energy for a propulsion motor, which routinely does not require charging by a utility battery charger.

It is also an object of this invention to provide such a battery and solar cell assembly with a display which will indicate the need, if any, for additional charging of the batteries.

It is also an object of this invention to provide a solar cell array which will provide a rapid charging of the batteries, while avoiding detrimental overcharging.

In accordance with these and other objects, which will become apparent hereafter, the instant invention will now be described with reference to the accompanying drawings.

SUMMARY OF THE INVENTION

A solar cell array is provided for recharging electric batteries, such as those used to propel a vehicle. The array is divided into a panel or a group of panels for the charging of each of the batteries instead of being connected across the string of series connected batteries. This arrangement provides a more rapid recharging and is possible because diodes provide the electrical separation as well as preventing current flow from the batteries to the solar cells. The array is also particularly suited for mobile applications because is flexible and so mounted that the panels are held in place.

DETAILED DESCRIPTION OF THE INVENTION

Figure 1:
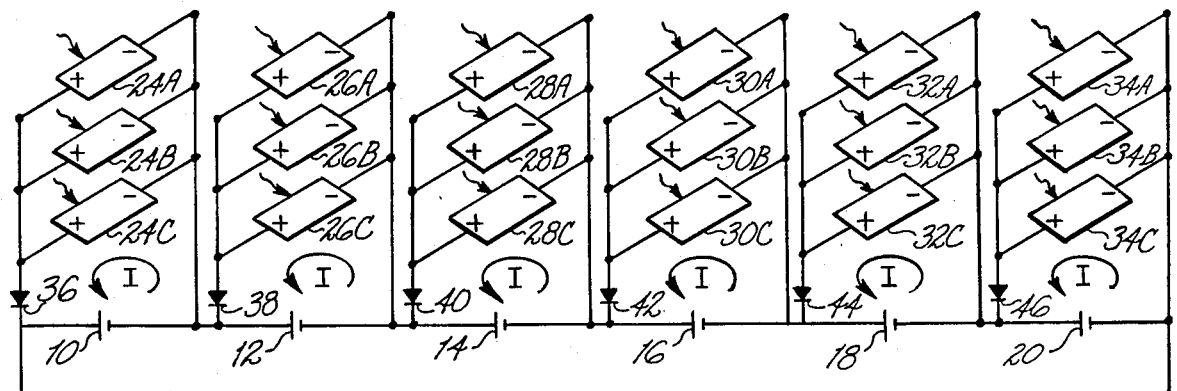
FIG. 1 is a schematic showing the electrical arrangement of the invention.

Referring to FIG. 1, batteries 10–20 are shown connected in series and to the terminals of motor 22. In the embodiment built and illustrated each battery is a lead-acid battery which is nominally rated as six volts, but the actual voltage of the batteries will typically vary so that the six batteries when new and fully charged may measure forty volts and supply 220 amperes. After the batteries have been used for several months, the maximum voltage that the six series connected batteries will reach may be 38.8 volts or thereabout.

Motor 22 represents the 36 volt motor on the golf cart on which the present invention was installed. Motor 22 will continue to drive the cart even when the batteries have discharged to the point where the measured voltage is 36.8 volts and the current 100 amperes. It is considered to be detrimental to the batteries to discharge them below this voltage.

In accordance with the invention, connected across each of the batteries 10–20 is a solar cell panel or group of panels. For example, battery 10 has connected across its terminals panels 24A–24C. Each of these panels is connected in parallel and has a nominal open circuit voltage of 9.5 volts and a power rating of 5 watts. Connecting three panels is parallel provides more current without increasing the voltage. It will be recognized that panels of other sizes may be used to provide the required power and voltage. In the embodiment built each panel has a solar cell area of 11.5 inches by 16.5 inches and is designated as LAM 110-2 by the supplier, Sovonics, Inc. of Troy, Mich. These panels are flexible and have amorphous silicon cells mounted on a substrate which provides a margin around the cells.

Each group of panels such as panels 24A–24C has a diode such as diode 36 connected between it and its respectivbe battery such as battery 10 so as to permit current flow from the solar cell panels to the battery and to prevent current flow in the opposite direction. These diodes also tend to isolate each panel group from the other panel groups so as to permit a more rapid charging of the batteries than would be the case if the entire array was connected across the end terminals of the first and last batteries 10 and 20 respectively.

Also depicted in FIG. 1, is voltmeter 48 which is connected across the series connected batteries so as to provide an indication of the state of charge of these batteries.

As previously indicated, it is desired to avoid, or at least minimize the necessity to recharge the batteries using a charger deriving its energy from a utility. This object has been accomplished by recharging the batteries by exposing the solar cell array to sunlight. In the installed system when in use on a golf course, it has been found that the batteries will recharge in the intervals when the cart is stopped, and the batteries will also recharge if the cart is operated without stopping. (That is, the startup load provides the largest drain on the batteries.) This recharging profile assumes, naturally, that sufficient insolation is available. In Florida, on a partly cloudy day, this type of recharging will occur. If the insolation is not adequate to recharge the batteries while the cart is in use, it still may be sufficient to recharge the batteries while the cart is at rest. Finally, in extended periods where the insolation is inadequate, utility energy may be employed. Voltmeter 48 provides an indication of whether the batteries are adequately charged or need recharging.

Figure 2:
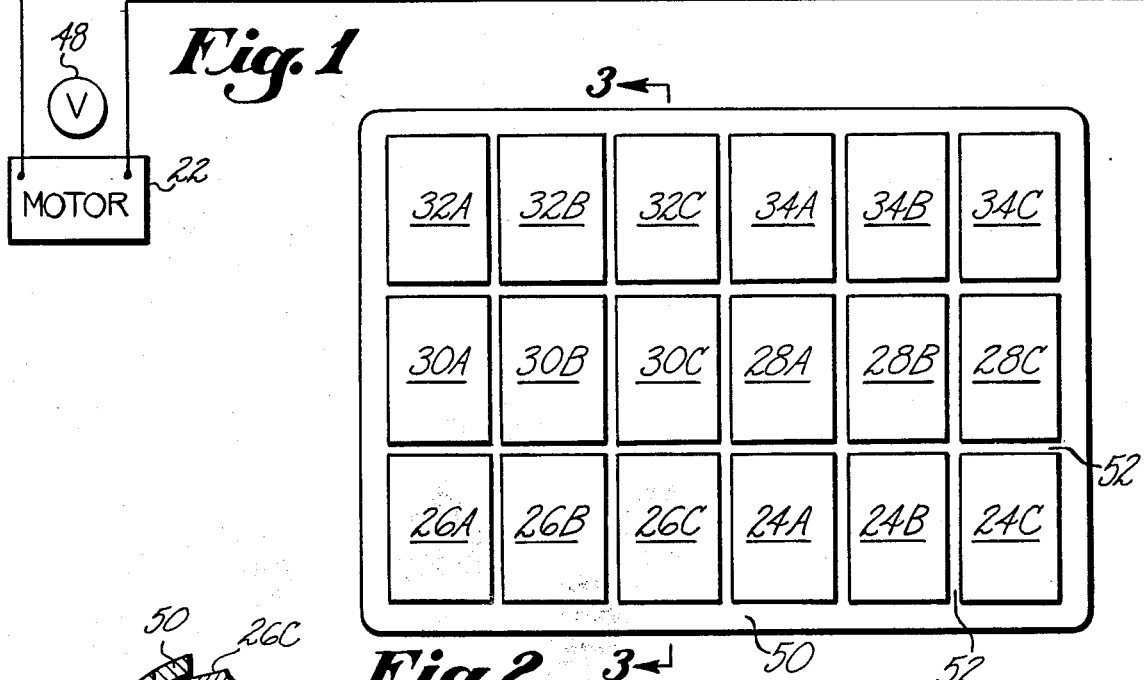
FIG. 2 is a plan view of a solar cell array in accordance with the invention.

Referring now to FIG. 2, the manner in which the solar cell panels of FIG. 1 have been arranged into an array is shown. Panels 24A-24C are arranged to be side-by-side, and the other panels are similarly arranged side-by-side in groups of three. Margin 50, which provides a peripheral margin about the array, and strips 52 which extend between the actual solar cell areas of the panels, serve to mechanically connect the various panels into the array. The margin 50 and dintervening strips 52 are secured to the substrates upon which the solar cells are held by stitching, adhesives, or other well known means. In the embodiment constructed, acrylic canvas which is resistant to ultraviolet radiation was used to perform this mechanical connection.

Figure 3:
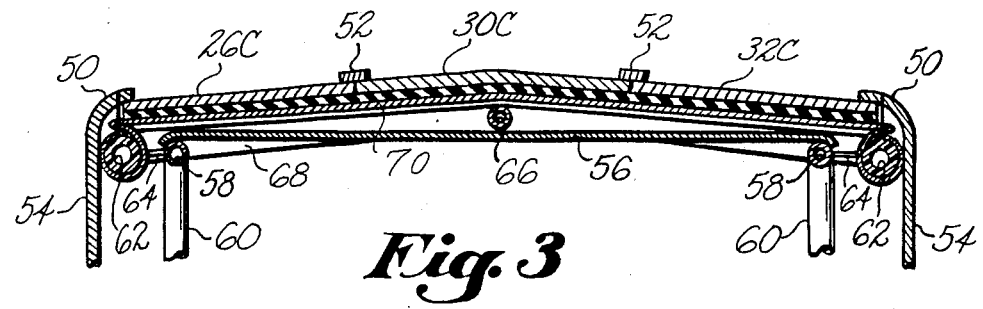
FIG. 3 is a cross-sectional elevation taken on the line 3—3 of FIG. 2.

In the cross-sectional view of FIG. 3, panels 26C, 30C and 32C are shown with connecting strips 52 and margin 50. As shown, it is preferred that margin 50 have a depending canopy portion 54. Canopy portion 54 provides shade for the occupants of the golf cart in addition to the shade resulting from the area of the array.

The golf cart had an existing roof 56 which was mounted on longitudinal supports 58. Vertical supports, such as vertical supports 60, were provided adjacent to the four corners of this roof. The array of the present invention has two longitudinal supports 62 which are located on opposite sides of the array and secured by bolts 64 to supports 58. A third, centrally located longitudinal support 66 rests on roof 56. Lateral supports, such as lateral support 68, connect the three longitudinal supports 62, 62,and 66 at each end of the longitudinal supports. It should be noted that the central longitudinal support 66 is positioned to be higher than the side supports 62. This arch type arrangement promotes the flow of rain off the array.

Figure 4:
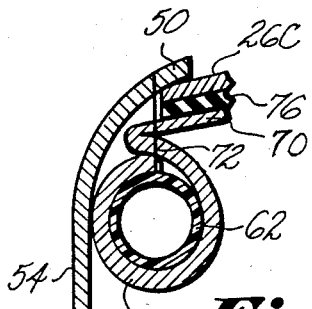
FIG. 4 is an enlarged detail of a portion of FIG. 3.

A fabric cover 70, shown more clearly in the FIG. 4 detail, extends over central longitudinal support 66 and around longitudinal supports 62, to be held by stitching 72. Stitching 72 also holds margin 50 in position. This stitching thereby forms longitudinally extending sleeves 74 which can be slipped over supports 62 before one of the lateral supports 68 is secured. A similar pocket is not needed at the ends of cover 70 as it is held against longitudinal movement after installation by other means.

Supported on cover 70 is thermal insulation sheet 76 which is essentially coextensive with the array. A flexible sheet about one eighth of an inch thick having the trademark THERMOBAR (trademark of Mead Company) has been satisfactorily used. Sheet 76 minimizes transfer of heat from the solar cell array to roof 56 and the passengers below. The reduced transfer of heat from the solar cells appears to improve the electrical performance.

The solar array is supported by sheet 76 and enclosed within the fabric cover 70 and the margins 50 as described above. It should be appreciated that sheet 76 and cover 70 also provides cushioning for the array.

This cushioning and the flexible nature of the solar cell panels make the array of the present invention particularly suitable for mobile applications.

Although not shown in FIG. 3, the electrical conductors of FIG. 1 which connect to the panels are connected on the reverse or under side of the panels and then led to the rear. They may be carried through a vertical support 60 or in a separate conduit.

Although the array of this invention has been shown mounted on the existing roof of a golf cart, it will be apparent that it can be readily mounted on a golf cart which does not have a roof or on other types of vehicles.

While the instant invention has been shown and described herein in what is conceived to be the most practical and preferred embodiment, it is recognized that departures may be made therefrom within the scope of the invention, which is therefore not to be limited to the details disclosed herein, but is to be afforded the full scope of the claims so as to embrace any and all equivalent apparatus and articles.

I claim:

1. In a vehicle having a propulsion motor powered by electrical energy, a battery and solar cell assembly for providing electrical energy comprising:
   a plurality of batteries;
   a solar cell array having a plurality of solar cell panels;
   said solar cell array connected to supply electricity to said batteries;
   each of said panels having a flexible substrate facilitating the positioning of said panel is other than a planar configuration;
   each of said substrates having a rectilinear configuration defined by edges and said substrates mechanically joined along abutting edges to form a rectilinear array having a peripheral margin;
   a fabric covering extending beneath said rectilinear array and enclosing said peripheral margin of said array; and
   a support structure beneath said fabric covering having a plurality of longitudinal supports connected by a plurality of lateral supports.

2. In a vehicle having a propulsion motor powered by electrical energy, a battery and solar cell assembly in accordance with claim 1 wherin:
   fabric strips are used to mechanically join said substrates; and said fabric strips are joined to said fabric covering.

3. In a vehicle having a propulsion motor powered by electrical energy, a battery and solar cell assembly in accordance with claim 2 wherein:
   said fabric strips and said fabric covering are fabricated of canvas resistant to ultraviolet light.

4. In a vehicle having a propulsion motor powered by electrical energy, a battery and solar cell assembly in accordance with claim 1 wherein:
   said fabric covering is joined to a plurality of said longitudinal supports.

5. In a vehicle having a propulsion motor powered by electrical energy, a battery and solar cell assembly in accordance with claim 1 wherein:
   said fabric covering has a canopy portion dependent from said peripheral margin.

6. In a vehicle having a propulsion motor powered by electrical energy, a battery and solar cell assembly in accordance with claim 1 wherein:
   said plurality of batteries are connected in series;

each of said batteries having a positive and a negative terminal;

each of said solar cell panels having a positive and a negative terminal;

each of said solar cell panels connected across the terminals of a different said battery;

a diode is connected between each said panel and its respective battery to permit current flow only from each said panel to each said respective battery.

7. In a vehicle having a propulsion motor powered by electrical energy, a battery and solar cell assembly in accordance with claim 1 wherein:

said plurality of batteries are connected in series;

each of said batteries having a positive and a negative terminal;

said plurality of solar cell panels are arranged in a plurality of groups;

each of said solar cell panels having a positive and a negative terminal;

each of said plurality of solar cell panels in each group is connected in parallel and each of said groups is connected across the terminals of a different said battery; and a diode is connected between each said group and its respective battery to permit current flow only from each said group to each said respective battery.

8. In a vehicle having a propulsion motor powered by electrical energy, a battery and solar cell assembly in accordance with claim 1 further including:

a thermal insulation sheet positioned between said rectilinear array and said fabric covering.

9. In a vehicle having a propulsion motor powered by electrical energy, a battery and solar cell assembly for providing electrical energy comprising:

a plurality of batteries connected in series;

each of said batteries having a positive and a negative terminal;

a solar cell array having a plurality of solar cell panels;

each of said solar cell panels having a positive and a negative terminal;

each of said solar cell panels connected across the terminals of a different said battery; and a diode connected between each panel and its respective battery to permit current flow only from said panel to its respective battery.

10. In a vehicle having a propulsion motor powered by electrical energy, a battery and solar cell assembly in accordance with claim 9 wherein:

each of said panels has a flexible substrate facilitating the positioning of said panel in other than a planar configuration;

each of said substrates has a rectilinear configuration defined by edges and said substrates mechanically joined along abutting edges to form a rectilinear array having a peripheral margin.

11. In a vehicle having a propulsion motor powered by electrical energy, a battery and solar cell assembly in accordance with claim 10 further including:

a heat insulating sheet positioned beneath said rectilinear array;

a fabric covering extending beneath said heat insulating sheet and enclosing said peripheral margin of said array a support structure beneath said fabric covering having a plurality of longitudinal supports connected by a plurality of lateral supports; and a voltage indicating device connected across said batteries.

12. In a vehicle having a propulsion motor powered by electrical energy, a battery and solar cell assembly in accordance with claim 9 wherein:

said solar cell array has a plurality of groups of a plurality of solar cell panels; and each of said groups of solar cell panels is connected across the terminals of a different said battery.

13. In a vehicle having a propulsion motor powered by electrical energy, a battery and solar cell assembly in accordance with claim 12 wherein:

said plurality of solar cell panels in each group are connected in parallel.

14. A solar cell powered battery charging system comprising:

a series string of n rechargable batteries;

n groups of solar cell panels;

each of said groups having m solar panels connected in parallel;

each of said n rechargable batteries having a different one of said n groups of solar cell panels connected across it; and a diode connected between each of said groups of solar cell panels and its respective battery permitting current flow only in the direction from said solar cell panel groups to said batteries.

* * * * *